US009419920B1

(12) United States Patent
Rohrer et al.

(10) Patent No.: US 9,419,920 B1
(45) Date of Patent: Aug. 16, 2016

(54) GATEWAY ROUTER AND METHOD FOR APPLICATION-AWARE AUTOMATIC NETWORK SELECTION

(71) Applicant: The United States of America, as represented by the Secretary of the Navy, Washington, DC (US)

(72) Inventors: Justin Paul Rohrer, Salinas, CA (US); Geoffrey G. Xie, Monterey, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 225 days.

(21) Appl. No.: 14/171,287

(22) Filed: Feb. 3, 2014

Related U.S. Application Data

(60) Provisional application No. 61/760,304, filed on Feb. 4, 2013.

(51) Int. Cl.
*H04L 12/701* (2013.01)
*H04L 12/931* (2013.01)
*H04L 29/08* (2006.01)
*H04L 29/06* (2006.01)

(52) U.S. Cl.
CPC ............ *H04L 49/355* (2013.01); *H04L 45/00* (2013.01); *H04L 67/00* (2013.01); *H04L 63/00* (2013.01); *H04L 69/00* (2013.01)

(58) Field of Classification Search
CPC ......... H04L 67/00; H04L 45/00; H04L 63/00; H04L 69/00
USPC .......................................... 370/351, 360, 401
See application file for complete search history.

(56) References Cited

U.S. PATENT DOCUMENTS

| 2010/0125901 | A1* | 5/2010 | Bathrick | H04L 45/00 726/13 |
| 2013/0111053 | A1* | 5/2013 | Perreault | H04L 67/2823 709/231 |
| 2013/0130615 | A1* | 5/2013 | Leguay | H04L 12/1845 455/3.01 |

* cited by examiner

*Primary Examiner* — Mark Rinehart
*Assistant Examiner* — Natali N Pascual Peguero
(74) *Attorney, Agent, or Firm* — Naval Postgraduate School; James B. Potts; Lisa A. Norris

(57) ABSTRACT

An Application-Aware Automatic Network Selection (ANS) router and method for automatic network selection, translation of data between networks, and application-specific feedback. In one embodiment, the router and method select between an Internet Protocol (IP) network and a Delay Tolerant Networking (DTN) network, monitoring the state of both networks, intercepting IP packets which could otherwise not be delivered, responding to the application that sent the packet, and translating a group of such packets into a DTN bundle; the software implementing this system resides on a network router that functions as a node on both the IP and DTN networks. In other embodiments, the system and method select between or among mobile ad hoc networks, sensor networks, vehicular networks, and satellite and deep space networks.

11 Claims, 7 Drawing Sheets

GATEWAY ROUTER AND METHOD FOR APPLICATION-AWARE AUTOMATIC NETWORK SELECTION

CROSS-REFERENCE TO RELATED APPLICATIONS

This application claims the benefit of U.S. Provisional Application No. 61/760,304 filed Feb. 4, 2013, which is hereby incorporated in its entirety by reference.

BACKGROUND OF THE INVENTION

1. Field of the Invention

The present invention relates generally to network routers.

2. Description of the Related Art

Networks which are prone to experience disruptions are commonly referred to as Challenged Networks. The standard suite of Internet protocols assume that a stable end-to-end (E2E) path exists, that the maximum round trip time is not excessive, and that the packet drop probability is small. Networks that do not have these properties can be generally categorized as: highly-mobile networks, exotic media networks, military ad hoc networks and sensor networks.

Highly-mobile networks, at best, experience frequent route changes. They can also become partitioned unexpectedly, and in some cases an E2E path may never exist. Exotic media networks include satellite communications, deep space radio frequency (RF) links, acoustic modulation (used underwater) and line-of-sight (LOS) high-frequency radio or optical links. Networks using these kinds of links can experience very high round-trip times (RTTs), or outages due to environmental conditions. Military ad hoc networks are typically required to operate under hostile conditions in which enemy jamming can cause interruption, and the threat of eavesdropping may trigger periods of radio silence. Sensor networks often have very limited resources in terms of power and transceiver range. This can result in frequent link disruptions as well networks that are subject to partitioning. Airborne telemetry networks tend to fall into the highly-mobile category, as well as having power and weight constraints similar to sensor networks. A wide range of approaches has been developed, from modifying traditional IP-based protocols to be more tolerant of disruption and delay, to new architectures that operate as application overlays. One of the latter approaches to building a delay tolerant network (DTN), sometimes also referred to as a disruption tolerant network, is known as the bundling protocol architecture.

Delay tolerant networking is designed to minimize the impact of intermittent communication problems, as well as environmental limitations and anomalies. Delay tolerant protocols have been developed for a variety of applications. Some of the most prevalent protocols that fall into this category are the interplanetary networking (IPN) protocol and delay tolerate networking research group (DTNRG) protocol. Interplanetary Networking (IPN) presents environmental challenges that are orders of magnitude larger than those found in terrestrial networks due to the speed-of-light delay. Interplanetary systems do have the advantage that the delays are known very exactly due to the predictable motions of the planets. Eventually it was realized that IPNs are a subset of the broader category Delay Tolerant Networks, and that the work had terrestrial applications. The Internet Engineering Task Force (IETF) delay tolerant networking research group (DTNRG) protocols are largely a continuation of the work started in the internet protocol network (IPN) project, but extend the concepts to include networks with unpredictable round-trip times caused by a variety of challenges in addition to speed-of-light delays.

The DTNRG developed two main protocols, the Bundle Protocol and the Licklider Transmission Protocol (LTP). The Bundle Protocol is an overlay store-and-forward network that sends packages of application data over a wide range of underlying network types using a sequence of gateways that serve as nodes in the overlay network. This represents the mainstream approach within the DTNRG group. A prominent example implementation of the bundling protocol is the SPINDLE 3 system developed by BBN Technologies. Another DTN protocol is the LTP protocol. LTP is a point-to-point protocol that deals with individual long delay links by freezing timers that would otherwise expire before an acknowledgement was received. It relies on a lower layer scheduler to tell it exactly when and how much to transmit. Because it is only designed for dedicated point-to-point links LTP does not handle congestion or routing issues.

An alternative to using native IP or application-layer overlays in the telemetry network environment is to translate telemetry data into a custom protocol stack designed for highly dynamic environments. A recent approach using this method is the Airborne Network Telemetry Protocol (ANTP) suite which is composed of the AeroTP transport layer, the AeroNP network layer, and the AeroRP routing layer.

Developing non-IP protocols is a long-term approach to the problem that has benefits in reducing overhead associated with IP, as well as improving cross-layer information sharing. The downside is that retrofitting a network designed around IP-based protocols to use another network layer is difficult and costly.

SUMMARY OF THE INVENTION

Embodiments in accordance with the invention integrate multiple networks in a seamless, application-aware fashion. In one embodiment traditional IP networks are integrated with DTN networks in a single device, herein termed the Application-aware Automatic Network Selection (ANS) gateway router device. The ANS router permits an increase the utility of both types of networks and improves the performance of data delivery. The single device ANS router incorporates state-of-the-art IP and DTN routing technologies, both of which are configured automatically by an ANS gateway method, which in one embodiment, is embodied as software code executable by a computer in the ANS router. The ANS router performs: monitoring the state of IP network connectivity; context-aware selection of the better network (IP or DTN) to deliver data; automated configuration/control of IP routing behavior; self-discovery of peer gateways connected to a DTN network; translation of IP packets to DTN bundle payloads; translation of DTN bundle payloads to IP packets; manipulation of application connections to prevent timeouts; and, informing applications directly of current network conditions.

Embodiments in accordance with the invention are best understood by reference to the following detailed description when read in conjunction with the accompanying drawings.

Embodiments in accordance with the invention are further described herein with reference to the drawings.

DETAILED DESCRIPTION OF THE INVENTION

Embodiments in accordance with the invention provide an ANS system 100 which utilizes one or more ANS gateway routers 102 to provide delay tolerant networking (DTN) by combining IP and DTN routing capabilities in a single low-power, low-cost, portable platform. The DTN routing is designed to mitigate the effects of disruptions in connectivity that would terminate conventional IP connections. In one embodiment, the ANS gateway router 102 is configured as a single, standalone device.

Figure 1:
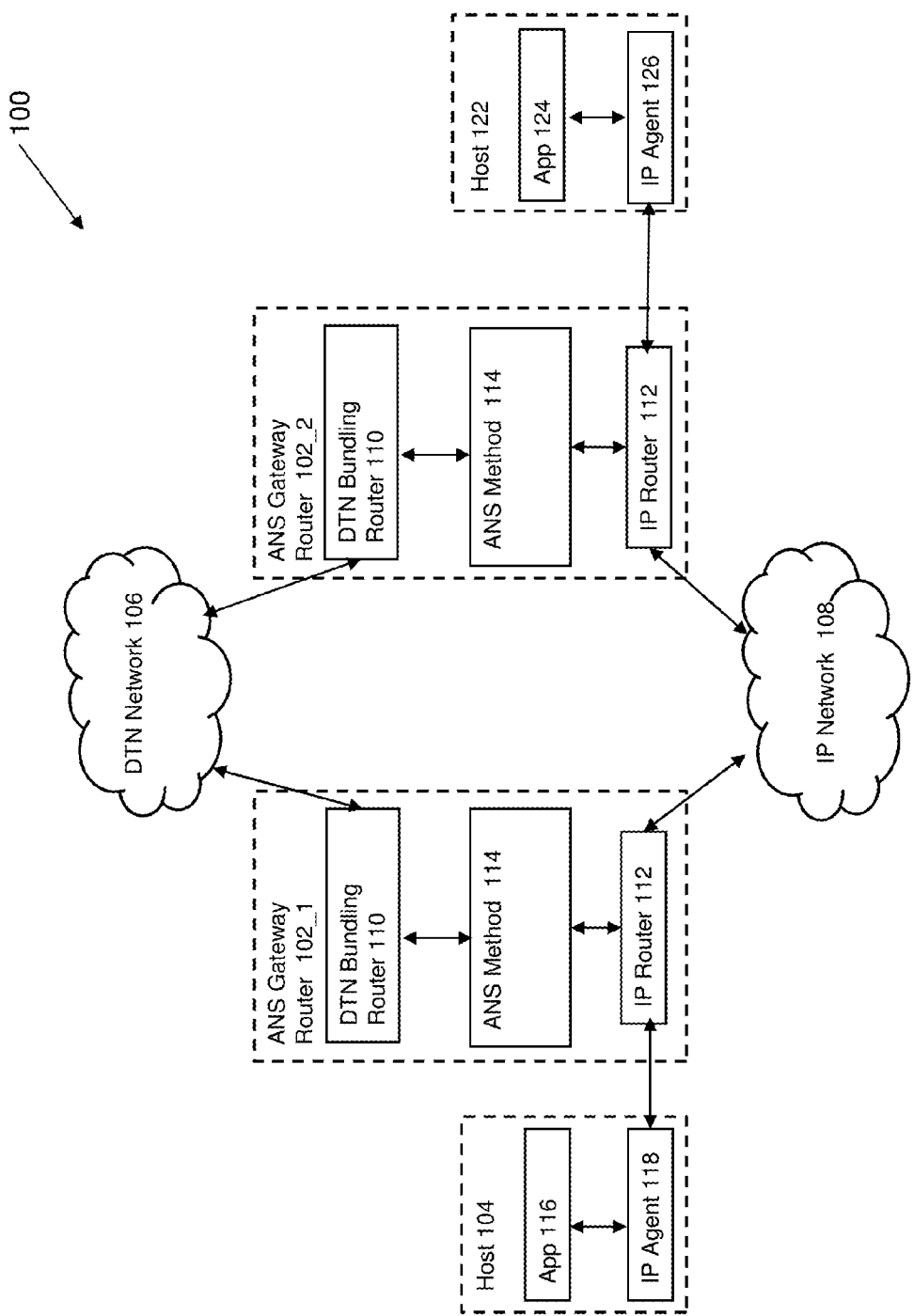
FIG. 1 illustrates an application-aware automatic network selection system including an application-aware automatic network selection (ANS) gateway router in accordance with one embodiment.

FIG. 1 illustrates an application-aware automatic network selection (ANS) system including an application-aware automatic network selection (ANS) gateway router in accordance with one embodiment. In one embodiment ANS system 100 includes one or more ANS gateway routers 102 that receive messages, i.e., one or more data packets, from one or more hosts, for example, host 104 for sending to a destination host, such as host 122. In FIG. 1 multiple ANS gateway routers 102 are differentiated for clarity of description using sub-identifiers, i.e., 102_1, a first ANS gateway router, and 102_2, a second ANS gateway router.

In one embodiment, ANS gateway router 102 includes: an internet protocol (IP) router 112; a DTN bundling protocol router 110; and an ANS method 114 that automatically determines when messages should be sent using an IP protocol or DTN protocol. In one embodiment, IP router 112 is a Linux-based software IP router. In one embodiment, the version of Linux used is derived from the Debian distribution, for example version 2.6.37 of the kernel.

In one embodiment, IP router 112 is an IP router that utilizes a Quagga routing implementation to support major dynamic routing standards including OSPFv2 [22], OSPFv3 [23], RIPv2 [24], RIPng [25], and BGPv4 [26]. Of these OSPFv3, RIPng, and BGPv4 include support for IPv6. This provides high-speed, stable IP packet forwarding through the network as long as coherent end-to-end paths exist. The names and acronyms of Quagga, open shortest path first protocol (OSPF), routing information protocol (RIP), and border gateway protocol (BGP) are well known to those of skill in the art and are not further detailed herein.

In one embodiment, DTN bundling protocol router 110 operates on the principle of custody transfer to provide reliability, instead of the end-to-end reliability typically provided by the transmission control protocol (TCP). For example, in one embodiment, a sending DTN application, such as an application 116, registers itself as an endpoint with a DTN router, i.e., DTN bundling protocol router 110, either running on the same host, or on a separate gateway communicating over standard IP protocols. Messages are passed from application 116 to DTN bundling protocol router 110 of ANS gateway router 102_1 at which point DTN bundling protocol router 110, assumes responsibility for delivery to the final destination of the message and the sending DTN application, e.g., application 116, flushes the messages from an associated DTN gateway buffer.

DTN bundling protocol router 110 must then determine a next-hop, i.e., a next routing recipient, which could consist of a destination application registered to the same gateway, or another DTN gateway, such as a second ANS Gateway router 102_2 connected to host 122 to which the destination application, application 124, is registered, or another DTN gateway (not shown) that will serve as an intermediate hop. The difference between this and conventional mobile ad-hoc network (MANET) routing is that the ANS gateway nodes 102 are only intermittently connected, so a message may remain buffered at the ANS gateway device 102_1 for a significant interval of time before a connection to the next hop becomes available.

In one embodiment, DTN bundling router 110 provides a plug-in interface for routing modules, allowing the routing protocol to be selected based on the characteristics of the network topology. Examples of DTN routing protocols supportable by the routing modules include, but are not limited to, MaxProp, PRoPHETv2, and RAPID. Each of these routing protocols uses an algorithm to learn the connectivity patterns established over time, and attempts to correctly predict the best next hop for messages based on these patterns. The names and acronyms of MaxProp, PRoPHETv2, and RAPID are well known to those of skill in the art and are not further detailed herein.

Generally viewed, the ANS gateway router 102 consolidates two devices, a traditional IP router and a DTN router, into a single device that compares favorably in terms of cost, size, weight, power, and performance with either of the two devices it replaces. However, in order to provide a truly integrated service, the IP and DTN routing functionalities are integrated such that IP traffic can be buffered and forwarded by the DTN routing functionality in cases where a coherent end-to-end IP routing path does not exist and the connections would otherwise have failed without the intervention of the DTN routing service. The mechanism for this integrated service is the ANS method 114 further described with reference to FIG. 2.

Figure 2:
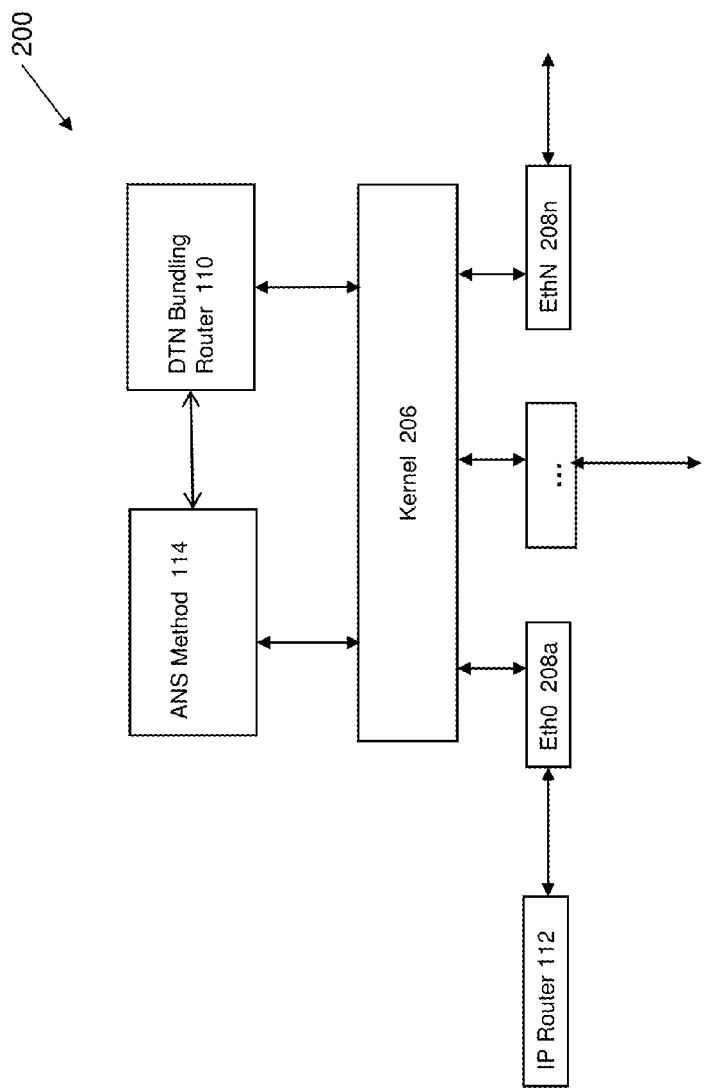
FIG. 2 illustrates components of the ANS gateway router including an application-aware automatic network selection (ANS) method in accordance with one embodiment.

FIG. 2 illustrates components of the ANS gateway router 102 of FIG. 1 including the application-aware automatic network selection (ANS) method 114 in accordance with one embodiment. In one embodiment, ANS method 114 acts as an IP application filter that intervenes before IP packets are dropped by the CPU kernel 206 due to lack of an IP route to the destination.

In one embodiment, ANS method 114 initially checks a message packet to see if the packet belongs to an application that will tolerate the expected delays of the DTN network. For example, ANS method 114 checks a message packet received kernel 206 via an Ethernet port Eth0 208a from IP router 112 and determines if the packet belongs to an application that will tolerate the expected delays of the DTN network, for example, DTN network 106 (FIG. 1). If not, the packet is returned to kernel 206 of ANS gateway router 102 to be dropped with standard internet control message protocol (ICMP) response. If the packet does belong to an application that is expected to tolerate some delay, e.g., expected delays of the DTN network, the packet is inserted into a DTN bundle and passed to DTN bundling protocol router 110 to be buffered and forwarded according to DTN routing semantics.

In one embodiment, ANS method 114 is not applicable to all traffic categories. For example, in one embodiment, real-time voice and video application data is not buffered and forwarded for later delivery. However for others, such as periodic telemetry data readings, a small delay in delivery is greatly preferable to losing the data permanently. Compared with using only DTN-aware applications, embodiments in accordance with the invention have the advantage of not requiring every IP-based application to be rewritten to support communication via a bundling protocol router.

As illustrated in FIG. 1, for purposes of description, assume a host system 104 sends a message, i.e., one or more data packets, from an application 116 via IP agent 118 to a first ANS gateway router 102_1. First ANS Gateway router 102_1 receives the data packet at IP router 112 for sending to another host, such as host 122. ANS method 114 determines if the data packet has encountered a delay such that the IP routing protocol will drop the packet. If the data packet is to be dropped ANS method 114 will automatically detect the data packet and will process the data packet for alternately sending the data packet over DTN network 106. ANS method 114 processes the data packet to DTN bundling router 110 which then forwards the packet to DTN network 106 for receipt at a second ANS gateway router 102_2 connected to host 122. DTN bundling router 110 of second ANS gateway router 102_2 receives the data packet and forwards it to ANS method 114 of second ANS gateway router 102_2. ANS method 114 of second ANS gateway router 102-2 processes the data packet for forwarding to IP router 112 of ANS gateway router 102_2. IP router 112 of ANS gateway router 102_2 then forwards the packet to IP agent 126 of host 122. IP agent 126 then forwards the data packet to application 124. In this way ANS gateway router 102 automatically detects when an IP or DTN protocol data packet is to be dropped due to an unacceptable delay and automatically reroutes the data packet over the alternate network.

In one embodiment, ANS gateway router 102 is implemented on a computer system including a central processing unit (CPU) and associated memory, software, and hardware, capable of supporting and implementing code of ANS method 114 utilized by ANS gateway router 102. In one embodiment, ANS gateway router 102 is implemented on an accelerated processing unit platform, such as the Advanced Micro Devices (AMD) Brazos platform (AMD, Sunnyvale, Calif.), having high I/O-bandwidth capability, low cooling requirements, and high performance vs. cost efficiency. The Zacate central processing unit (CPU) utilized in the AMD Brazos platform is a dual-core package having a 40 nm process, and runs at 1.6 GHz. The CPU communicates with other onboard components using a high-bandwidth universal mobile interface (UMI) interface. System storage and DTN buffering are provided using high-speed synchronous flash, accessed via a 6.0 Gbit/s serial advanced technology attachment (ATA) interconnect. In addition to the onboard gigabit Ethernet interface, four additional routable gigabit interfaces are interconnected to the CPU using a four peripheral component interconnect (PCI)-express 2.0 channels (20 Gbit/s aggregate). Eight gigabytes of dynamic random access memory operate at 1.33 GHz. In one embodiment, the entire the ANS gateway device 102 is enclosed in a steel chassis 8.7" wide, 12.9" deep, and 3.8" tall. Power consumption is approximately 35 W under typical load, which is low enough that active cooling fans are not required under most circumstances.

As earlier described, embodiments in accordance with the invention are relatively small, consume little power, and require little cooling. In preliminary testing the ASN gateway router 102 was capable of simultaneously routing two flows of 800 Mb/s each, effectively saturating the unidirectional capacity of 4 of the 1 Gb/s interfaces. This represents a routed traffic load of over 120,000 pkts/s. In one embodiment, OSPF was used for route discovery and enabled DTN bundling protocol router 110 during these tests. While under this traffic load, the average system load remained below 2%, and system memory usage remained below 150 MBytes out of the available 8192 MBytes.

Figure 3:
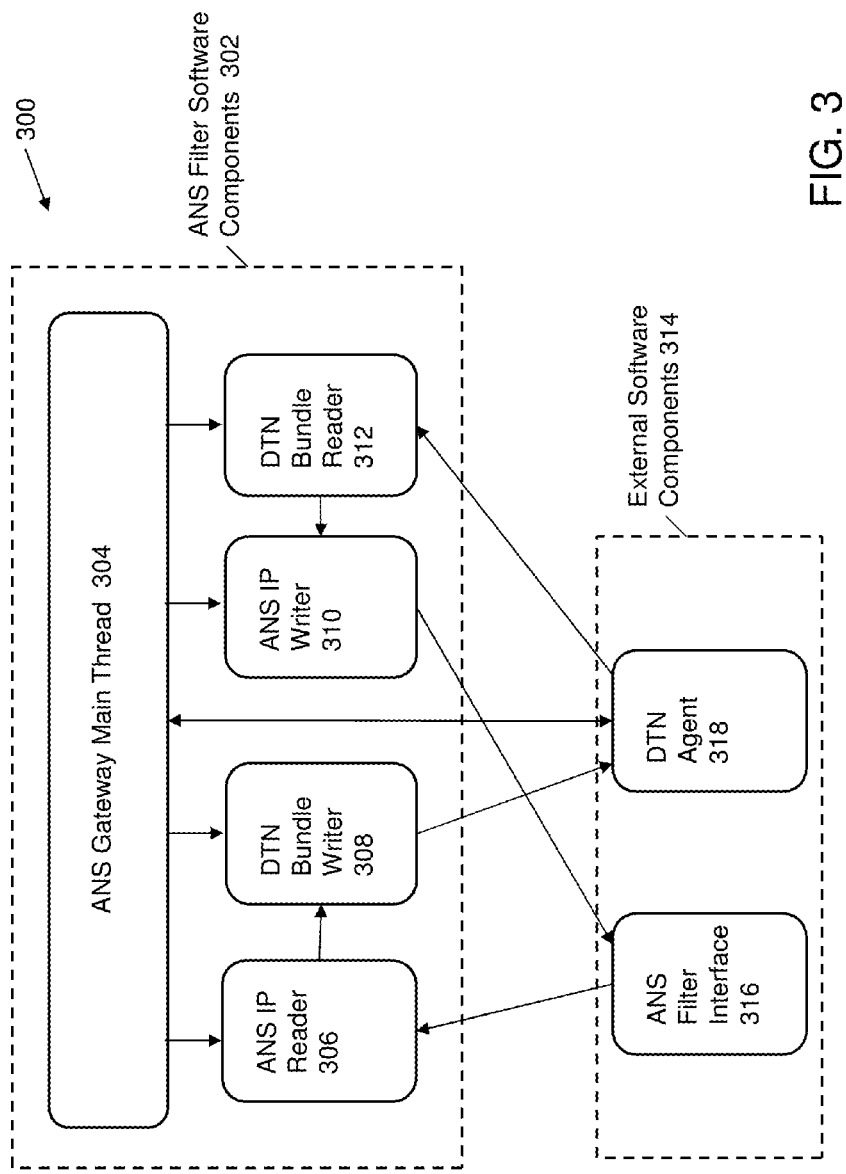
FIG. 3 illustrates components of the ANS software used in implementing the ANS method in accordance with one embodiment.

FIG. 3 illustrates components of the ANS software used in implementing the ANS method in accordance with one embodiment. As shown in FIG. 3, software components of the ANS method 114 code include ANS filter software components 302 and external software components 314. In one embodiment ANS filter software components 302 include: an ANS gateway main thread 304; an ANS IP reader 306; a DTN bundle writer 308; an ANS IP writer 310; and a DTN bundle reader 312. In one embodiment, external software components 314 include: an ANS filter interface 316 and a DTN agent 318.

Figure 4:
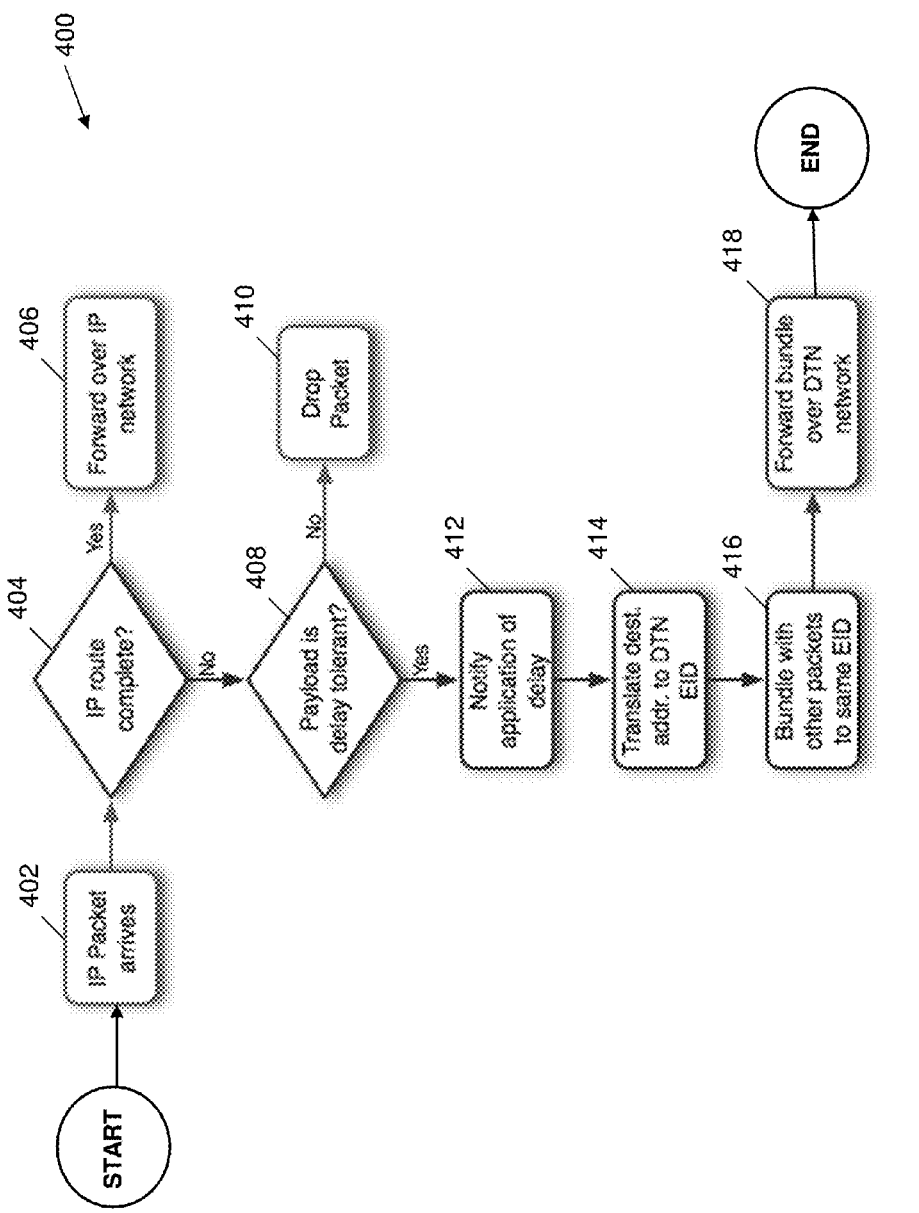
FIG. 4 illustrates a processing flow diagram of processing of an IP packet in accordance with one embodiment.
Figure 5:
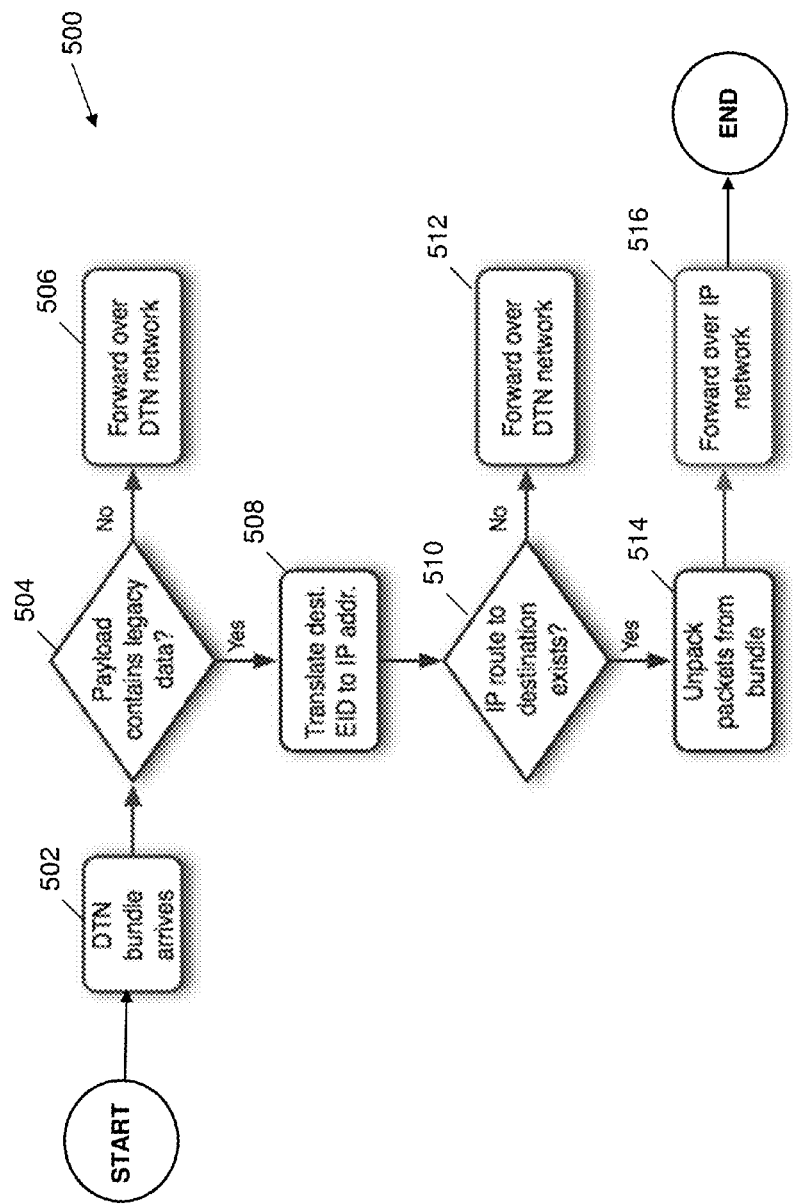
FIG. 5 illustrates a processing flow diagram of processing of a DTN bundle in accordance with one embodiment.

FIGS. 4 and 5 illustrate a processing flow diagram of sub-methods of ANS method 114 in accordance with one embodiment. FIG. 4 illustrates a processing flow diagram of processing of an IP packet in accordance with one embodiment. FIG. 5 illustrates a processing flow diagram of processing of a DTN bundle in accordance with one embodiment. Both methods can be performed by ANS method 114 of ANS gateway router 102 dependent upon the packet received. As earlier described ANS method is implemented as software code readable and implemented by a computer system of ANS gateway router 102.

Referring now to FIG. 4 and FIG. 1 together, in one embodiment, at operation 402 an IP packet arrives at a first ANS gateway router 102. For example, the IP packet could arrive at IP router 112 of ANS gateway router 102_1 from IP agent 118 of host 104. In check operation 404, ANS method 114 determines if the IP packet route is complete. If the IP packet route is complete ("Yes"), at operation 406 the IP packet is forwarded over IP network 108. Alternatively, if the IP packet route is not complete ("No"), processing moves to check operation 408 in which ANS method 114 determines if the payload of the IP packet is delay tolerant.

In check operation 408, if the payload is not determined to be delay tolerant ("No"), the IP packet is dropped. Alternatively, if the payload is determined to be delay tolerant ("Yes"), processing transitions to operation 412. In operation 412, ANS method 114 notifies the sending application of the delay. For example, ANS method 114 sends a notification via IP router 112 to IP agent 118 and then to application 116 of host 104. From operation 412, processing transitions to operation 414 in which ANS method 114 translates the destination address to a DTN endpoint identifier (EID) and processing transitions to operation 416.

In operation 416 ANS method 114 bundles the IP packet with other packets to the same DTN EID into a DTN bundle at DTN bundling router 110 and processing transitions to operation 418. In operation 418, ANS method 114 then forwards the DTN bundle now containing the bundled IP packet over the DTN network 106 with processing of the IP packet by ANS gateway router 102_1 complete.

Referring now to FIG. 5 and FIG. 1 together, in one embodiment, at operation 502 the DTN bundle arrives at an ANS gateway router 102, such as ANS gateway router 102_2. At check operation 504 ANS method 114 of ANS gateway router 102_2 determines if the payload contains legacy data. If the payload does not contain legacy data ("No"), processing transitions to operation 506 with ANS method 114 forwarding the DTN bundle over the DTN network 106. Alternatively, if the payload contains legacy data ("Yes"), processing transitions from check operation 504 to operation 508.

In operation 508 ANS method 114 translates the destination EID to an IP address and processing transitions from operation 508 to a check operation 510. In check operation 510, ANS method 114 determines if an IP route to the destination exists. If an IP route to the destination does not exist ("No"), from check operation 510, processing transitions to operation 512. In operation 512, the packet is forwarded over the DTN network 106. Alternatively, if an IP route to the destination does exist ("Yes"), from check operation 510, processing transitions to operation 514. In operation 514, the IP packets are unpacked from the DTN bundle and processing transitions to operation 516. In operation 516, the IP packets are forwarded over the IP network 108 to the destination with processing of the IP packet by ANS gateway router 102_2 complete.

In the above embodiment, the method operations shown in FIGS. 4 and 5 can be performed by ANS gateway router 102. Thus is can be understood by those of skill in the art that the process could have begun at ANS gateway router 102_2 with the IP packet being forwarded either over the IP network 108 or DTN network 106 to ANS gateway router 102_1.

Figure 6:
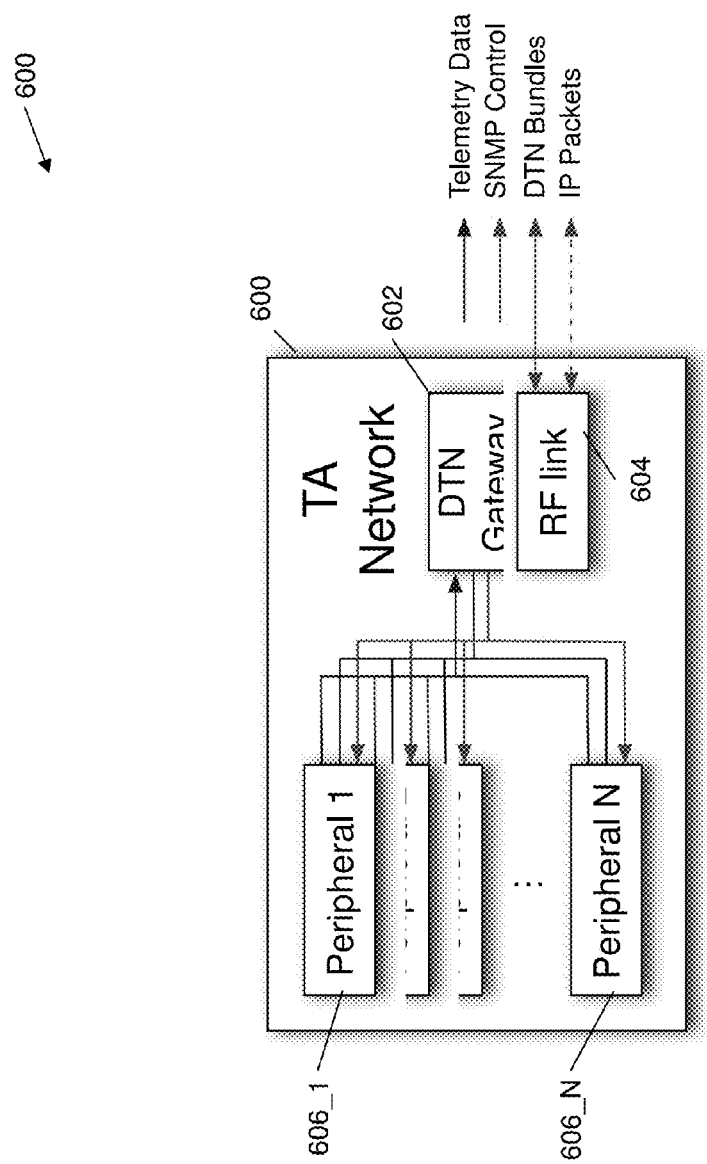
FIG. 6 illustrates a schematic drawing of an implementation of an ANS gateway router 102 in a ground network 600 in accordance with one embodiment.

In one embodiment, ANS gateway router 102 is designed to replace conventional IP routers in vehicle and ground networks, such as vNETs and gNETs. FIG. 6 illustrates a schematic drawing of an implementation of an ANS gateway router in a ground network 600, such as in a ground network associated with a ground station. In FIG. 6, an ANS gateway router 102, such as ANS gateway router 602, is connected to receive inputs from an RF link 604, such as DTN bundles and IP packets. Data from Peripherals 606_1 though 606_N can be sent and data received via ANS gateway router 602. In this way the data can be sent over an alternate network if a delay in a first network is encountered.

Figure 7:
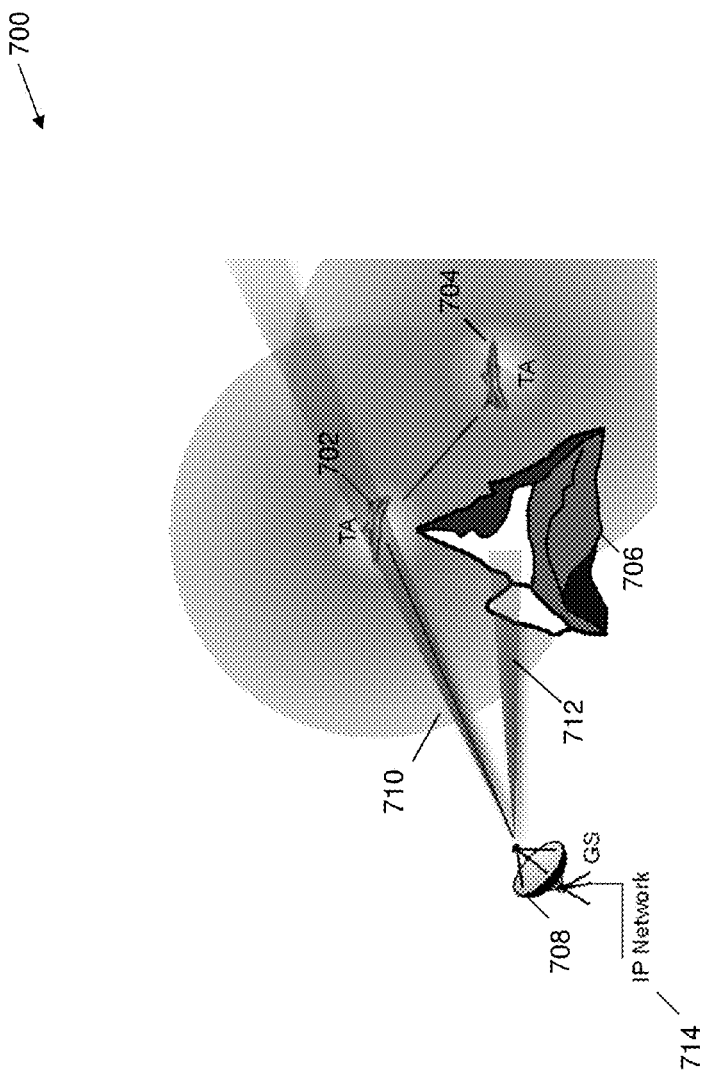
FIG. 7 illustrates loss of a line-of-sight (LOS) connection to a ground station in a test article network.

For example, referring to FIG. 7, when test article antennas, such as an antenna on jet 702 are within line-of-sight (LOS) of a ground station antenna, such as ground station 708 having ANS gateway router 602, conventional IP routing is used to forward packets, for example over IP network 714. However if the connection to ground station 708 is temporarily lost, such as with the antenna on jet 704, ANS gateway router 602 (FIG. 6) will automatically buffer packets, as well as search for multi-hop alternatives to the direct ground station connection. There are many environmental conditions that can result in a temporary outage of the TA to GS link, including terrain, such as mountain 706, and aerial maneuvers in which part of the aircraft structure interrupts LOS between the antennas. When either a multi-hop option is found, or the direct connection is restored, ANS gateway router 602 on the vNET forwards its stored bundles to the ANS gateway router at the next hop. When these bundles reach the gNET, the ANS gateway router there forwards them to the IP router of the ANS gateway router, which in turn unpacks them and passes the IP packets to the kernel of the CPU to be forwarded to the destination.

As described herein embodiments in accordance with the present invention provide a ANS gateway router which consolidates two devices, a traditional IP router and a DTN bundling router, into a single device that compares favorable in terms of cost, size, weight, power, and performance with either of the two devices it replaces. Embodiments in accordance with the ANS gateway router described herein integrates IP and DTN routing functionality, eliminates the need for a standalone IP gateway router, and eliminates the complexities arising from using two independently configured devices, i.e., one for IP and one for DTN, and the associated performance penalty. Advantageously no change to user applications is required in order to utilize DTN routing when IP routing is not feasible.

This disclosure provides exemplary embodiments of the present invention. The scope of the present invention is not limited by these exemplary embodiments. In particular, other protocols may be supported by the invention with addition or substitution of other associated router functionalities within the ANS gateway router and ANS method. Numerous variations, whether explicitly provided for by the specification or implied by the specification or not, may be implemented by one of skill in the art in view of this disclosure.

What is claimed is:

1. An Application-aware Automatic Network Selection (ANS) gateway router comprising:
a processor;
an internet protocol (IP) router;
a delay tolerant network (DTN) bundling router; and
a memory coupled to the processor, and having stored therein computer code to perform an ANS method for routing data packets, the ANS method comprising:
detecting an IP packet received at the IP router from a sending application; and
determining an IP route to a destination associated with the IP packet using the IP router and determining if the IP route can be completed by the IP router, and if the IP route can be completed by the IP router, forwarding the IP packet over an IP network using the IP router, and if the IP route cannot be completed by the IP router, invoking a DTN routing functionality, the DTN routing functionality comprising:
determining if a payload associated with the IP packet is delay tolerant, and if the payload associated with the IP packet is not delay tolerant, dropping the packet, and if the payload associated with the IP packet is delay tolerant:
generating and sending a notification of delay to the sending application;
translating a destination address of the IP packet to a DTN end point identifier (EID);
inserting the IP packet into a DTN bundle; and
forwarding the DTN bundle over a DTN network using the DTN bundling router.

2. The Application-aware Automatic Network Selection (ANS) gateway router of claim 1 wherein the IP protocol message with the DTN end point identifier is transmitted over more than one DIN network prior to arriving at the destination.

3. The Application-aware Automatic Network Selection (ANS) gateway router of claim 1 where determining if the IP route can be completed comprises detecting if the IP packet received at the IP router is to be dropped by the IP router.

4. The Application-aware Automatic Network Selection (ANS) gateway router of claim 1 where determining if the IP route can be completed comprises detecting if a coherent end-to-end path exists from the IP router to the destination associated with the IP packet.

5. The Application-aware Automatic Network Selection (ANS) gateway router of claim 1 where inserting the IP packet into the DTN bundle comprises bundling the IP packet with any other packets having the same DTN EID.

6. A method for application-aware automatic network selection (ANS) routing of data packets comprising:
detecting an internet protocol (IP) packet from a sending application received at an ANS gateway router;

determining an IP route to a destination associated with the IP packet using an IP protocol;

determining if the IP route to the destination can be completed using the IP protocol;

forwarding, if the IP route can be completed using the IP protocol, the IP packet over an IP network using the IP protocol; and invoking, if the IP route cannot be completed using the IP protocol and the IP packet is to be dropped by the IP protocol, a delay tolerant network (DTN) routing functionality by, determining if a payload associated with the IP packet is delay tolerant and, if the payload associated with the IP packet is not delay tolerant, dropping the IP packet and, if the payload associated with the IP packet is delay tolerant, generating and sending a notification of delay to the sending application, translating a destination address of the IP packet to a DTN end point identifier (EID), inserting the IP packet into a DTN bundle;

forwarding the DTN bundle including the IP packet over a DTN network.

7. The method of claim 6 where determining if the IP route can be completed comprises detecting if the IP packet received at the IP router is to be dropped by the IP router.

8. The method of claim 6 where determining if the IP route can be completed comprises detecting if a coherent end-to-end path exists from the IP router to the destination associated with the IP packet.

9. The method of claim 6 where inserting the IP packet into the DTN bundle comprises bundling the IP packet with any other packets having the same DTN EID.

10. An Application-aware Automatic Network Selection (ANS) gateway router comprising:

a processor;

a first protocol router in communication with a first network;

a second protocol bundling router in communication with a second network; and a memory coupled to the processor, and having stored therein computer code to perform an ANS method for routing data packets, the ANS method comprising:

detecting a packet received at the first protocol router from a sending application over the first network;

determining a route through the first network to a destination associated with the packet and determining if the route can be completed by the first protocol router, and if the route can be completed by the first protocol router, forwarding the packet over the first network using the first protocol router, and if the route cannot be completed by the first protocol router, invoking the second protocol bundling router by:

translating a destination address of the packet in the first network to a destination address of the packet in the second network;

inserting the packet into a bundle; and forwarding the bundle including the packet over the second network using the second protocol bundling router.

11. The Application-aware Automatic Network Selection (ANS) gateway router of claim 10 wherein the first protocol message with the second protocol identifier is transmitted over more than one second protocol network prior to arriving at the destination.

\* \* \* \* \*